US010393907B2

(12) United States Patent
Reime

(10) Patent No.: US 10,393,907 B2
(45) Date of Patent: Aug. 27, 2019

(54) METHOD AND DEVICE FOR DETECTING AN OBJECT HIDDEN BEHIND AN ARTICLE

(71) Applicant: ZIRCON CORPORATION, Campbell, CA (US)

(72) Inventor: Gerd Reime, Bühl (DE)

(73) Assignee: ZIRCON CORPORATION, Campbell, CA (US)

(\*) Notice: Subject to any disclaimer, the term of this patent is extended or adjusted under 35 U.S.C. 154(b) by 98 days.

(21) Appl. No.: 15/552,012

(22) PCT Filed: Feb. 12, 2016

(86) PCT No.: PCT/EP2016/052956
§ 371 (c)(1),
(2) Date: Aug. 18, 2017

(87) PCT Pub. No.: WO2016/131711
PCT Pub. Date: Aug. 25, 2016

(65) Prior Publication Data
US 2018/0074218 A1    Mar. 15, 2018

(30) Foreign Application Priority Data
Feb. 18, 2015 (DE) .................. 10 2015 202 880

(51) Int. Cl.
*G01R 19/00* (2006.01)
*G01V 3/08* (2006.01)

(52) U.S. Cl.
CPC .................... *G01V 3/088* (2013.01)

(58) Field of Classification Search
CPC . G01V 3/08; G01V 3/088; G01V 3/15; G01V 3/12; G01V 3/02; G01V 3/38;
(Continued)

(56) References Cited

U.S. PATENT DOCUMENTS 7,106,072 B2    9/2006  Clauss
7,812,722 B2 \* 10/2010  Krantz ............... G01V 3/15
                                                          340/551
(Continued)

FOREIGN PATENT DOCUMENTS

DE          69510447 B1    3/1994
DE      102009057439 A1    5/2011
(Continued)

OTHER PUBLICATIONS

International Search Report for corresponding appplication PCT/EP2016/052956 filed Feb. 12, 2016; dated May 11, 2016.
International Preliminary Report of Patentability for corresponding appplication PCT/EP2016/052956 filed Feb. 12, 2016; dated May 18, 2017.

*Primary Examiner* — Thang X Le
(74) *Attorney, Agent, or Firm* — Cantor Colburn LLP

(57) ABSTRACT

The invention relates to a method and a measuring arrangement for detecting an object (3) hidden behind an article (1). The method comprises the following steps: applying a first alternating voltage (5) to a first sensor (7); applying a second alternating voltage (9) to a second sensor (11) arranged adjacent to the first sensor (7); determining an effect (15) of the article (1) on at least one of the alternating voltages (5, 9) depending on a distance (13) of the sensor (7, 11) to the article (1); determining a change (17) in the dependent effect (15) occurring during a movement (19) of the sensor (7, 11) along the article (1); and detecting the object (3) in accordance with the change (17) of the dependent effect (15). In this way, a detection of an object hidden behind an article is improved such that the object can be recognized as independently as possible from a relative position of the device to the article, in particular, an angular position, in particular also if the device for detecting the object is manually moved beyond the article.

15 Claims, 6 Drawing Sheets

(58) Field of Classification Search
CPC ........ G01V 3/104; G01V 3/105; G01R 27/26;
G01R 27/2605; G01R 27/2641; G01B
7/003; G01B 7/004; G01D 5/241; G01D
5/2405
See application file for complete search history.

(56) References Cited

U.S. PATENT DOCUMENTS

| | | | |
|---|---|---|---|
| 9,835,752 B2* | 12/2017 | Reime | G01V 3/107 |
| 2004/0260174 A1* | 12/2004 | Keene | G01V 3/107 |
| | | | 600/424 |
| 2008/0238403 A1* | 10/2008 | Sanoner | G01V 3/088 |
| | | | 324/67 |
| 2013/0057249 A1* | 3/2013 | Winter | G01V 3/38 |
| | | | 324/67 |
| 2013/0207667 A1 | 8/2013 | Zibold | |
| 2015/0015231 A1* | 1/2015 | Zibold | G01N 27/22 |
| | | | 324/67 |
| 2015/0123646 A1* | 5/2015 | Albrecht | H03K 17/00 |
| | | | 324/67 |

FOREIGN PATENT DOCUMENTS

| | | |
|---|---|---|
| DE | 102013226887 A1 | 6/2015 |
| DE | 102014010671 A1 | 12/2015 |
| WO | 2012104086 A2 | 8/2012 |

* cited by examiner

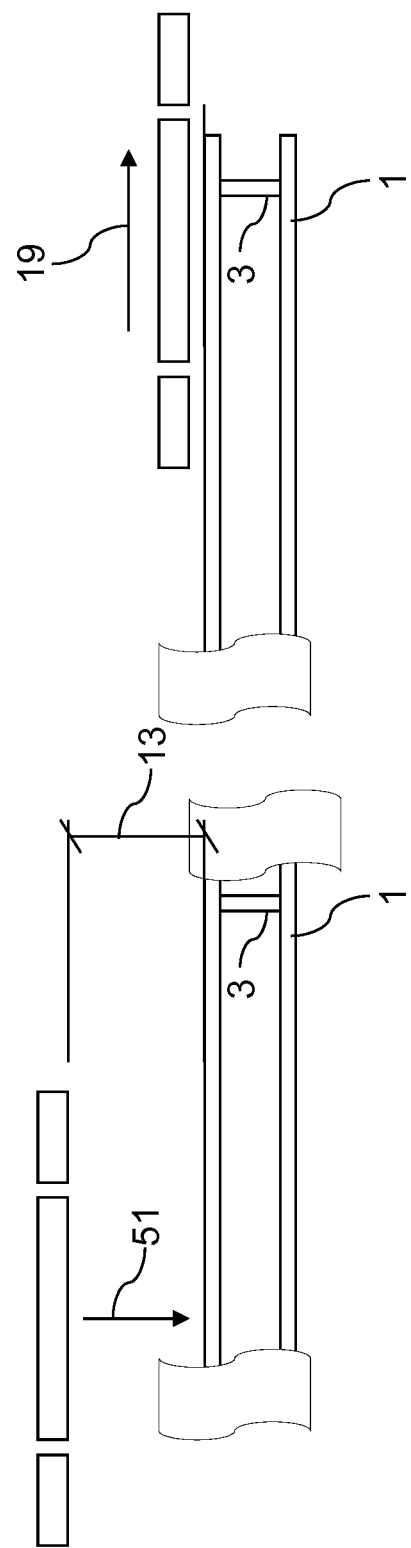

METHOD AND DEVICE FOR DETECTING AN OBJECT HIDDEN BEHIND AN ARTICLE

CROSS REFERENCE TO RELATED APPLICATIONS

The present application relates to and claims the priority of the German patent application 10 2015 202 880.1, filed on 18 Feb. 2015, the disclosure of which is hereby expressly incorporated by reference into the subject matter of the present application in its entirety.

TECHNICAL FIELD

The invention relates to a method and a measuring arrangement for detecting an object hidden behind an article.

BACKGROUND

The detection of objects hidden behind articles is known. Suitable methods and/or devices can be used, for example, for finding valuable objects, in particular as so-called treasure-detecting devices. In addition, so-called line-locating devices or stud-locating devices are known. These have at least one sensor which can interact with the object to be found by means of at least one alternating voltage. The at least one sensor can be configured as inductive or capacitive. The article behind which the object is hidden can be, for example, a cladding in the form of wood and/or plasterboard whereby the object to be found is a support, for example, in the form of a beam. In such applications, sometimes weak signals occur. For the processing of such relatively weak signals, it is known to amplify them and/or to compensate them by means of regulation, wherein for a measurement evaluation, it is not the signal actually occurring at the sensor, but rather a control signal of the compensating regulation that is evaluated. The control signal can be an alternating voltage having a phase and an amplitude which can be generated by means of a pulse width modulator serving as a controlling element.

It is known to evaluate such a control signal in a phase space thereof. For example, from the earlier patent application DE 10 2013 226 887.4, an inductive sensor arrangement and a method for the detection of at least one target is known. It is provided that the target has a changeable shape or composition along a measuring direction and that in a 4-quadrant representation of the regulating signal, the angle of an imaginary vector to an x-axis of an xy-coordinate system which leads from the origin of the xy-coordinate system which corresponds to the regulated state of a transmitter-receiver coil system to a measurement point is a measure of the movement of the target in a measuring direction and/or the magnitude of the imaginary vector is a measure of a spacing of the target from the transmitter-receiver coil system normal to the measuring direction.

Furthermore, the earlier patent application DE 10 2014 010 671.3 relates to a method for determining at least one physical parameter by means of a sensor unit wherein the output signal of the sensor unit is substantially reduced to a fundamental wave of an excitation, wherein at least one pulse width modulation generates a respective correction signal with a variable pulse width and possibly variable phase and adds to an output signal of the sensor unit and thereby regulates the output signal in the whole phase space, wherein the pulse width of the correction signal and/or the phase of the correction signal is determined by the deviation of the output signal from zero.

DE 695 10 447 T2 discloses a device for recognizing the position of a stud in a partition wall.

In addition, from the international patent application WO 2012/104086 A2, a method for locating metallic or metal-containing objects and materials is known.

The patent application DE 10 2009 057 439 A1 concerns a device and a method for error-free capacitive measurement acquisition.

BRIEF SUMMARY

The disclosure provides to improve a detection of an object hidden behind an article, so that the object can be recognized as far as possible independently of a relative position of the device to the object, in particular an angular position, in particular when the device for detecting the object is moved manually over the article.

For detecting the object, the object advantageously enters, with the sensors, into a fundamentally known interaction which can be detected. Conditional to the system, it is provided that the sensors can also enter into an interaction with the article hiding the object. A slight change in the distance of the sensor from the article causes a change in the interaction. This can also be the case, for example, with hand-held devices due to a slight angular change of a corresponding device relative to the article. It has been discovered that the effect dependent upon the distance of the sensor from the article is determinable. The determination of the dependent effect preferably takes place by means of an evaluation and/or analysis of the fundamentally occurring interaction. A dependent effect can be understood to be a function, in particular a mathematical function and/or an effect correlation, in particular a cause-effect relationship for the formation of influencing variables on target values. Advantageously, therefore, the dependent effect can be characterised as an effect correlation and/or a function of the distance. It has also been discovered that slight changes of an angle of the device relative to the article, which can cause measurement errors, correspond to this dependent effect, that is, they comply with the function or the effect correlation. It has also be discovered that the dependent effect changes or no longer applies as soon as the hidden object is present behind the article. Therefore, in particular, a distance-dependency of the dependent effect and a change in this distance-dependency are determined, wherein, on the basis of this change, the object is detectable since in the presence of the object behind the article, the distance-dependency is no longer valid and/or is changed. In particular, a determination of a concrete distance-dependency of the effect of the article on the sensor and the change of the determined distance-dependency through the presence of the object takes place. The change can be determined in any desired manner, for example, in the form of a measured value, a comparison, a mathematical calculation, non-fuzzy or fuzzy logic criteria, a change of a system behaviour of a system having only the article or the article and the object and a measuring arrangement and/or the like. Determination can be understood as a direct determination or a temporally preceding determination, storage and later retrieval, possibly only the retrieval.

Preferably, therefore, by means of the determination of the dependent effect, initially a distance-dependent function or an effect correlation can be determined. In particular, this can initially be stored. Advantageously, it can be assumed therefrom that in the presence of the object, measurement values or values of a corresponding measurement signal always behave according to the dependent effect, that is according to the function or the effect correlation. By this means, a corresponding output signal can be evaluated with regard to the dependent effect. This can advantageously take place, in particular, in that provided the output signal behaves according to the function or the effect correlation, it can be concluded that only the article is present in a detection range of the sensor. By this means, small angular changes and/or associated changes of the distance of the sensor relative to the article which although they lead to a change in the measurement signal, are nevertheless evaluated to the effect that no object is situated behind the article.

On actual detection, the sensors can now be guided along the article, in particular along a surface of the article, in particular manually. Advantageously, herein, as soon as the hidden object is situated in the detection range of the sensor, the change in the dependent effect can be determined. In particular, a comparison of the currently occurring effect or the actually occurring measurement signal with the dependent effect, that is the function and/or the effect correlation, can take place. In particular, for this purpose, a corresponding comparison can be evaluated. Advantageously, in this way, dependent upon the change in the dependent effect, the presence of the object behind the article can be deduced. Advantageously, this can take place independently of a distance of the article from the sensors, at least within certain limits, in particular provided the subject matter and/or the object are within a measurement range of the sensors. It is therefore advantageously possible initially to evaluate the measurement signal of the sensor in relation to the article and thereby to carry out a calibration. With knowledge of the dependent effect that the article causes, advantageously, the presence of the object can be deduced independently of the distance. A change of the dependent effect can therefore be understood to be a change in the effect correlation and/or the distance-dependent function, that is, not only a simple change of a measurement signal respectively currently occurring at or between two time points. Thus, as an additional evaluating criterion, the dependent effect can be taken into account wherein changes of the measurement signal occurring can be ignored if a first measurement signal determined, in particular at an earlier time point, and a further or second, in particular current, measurement signal obey the dependent effect and/or are attributable thereto and/or can be explained thereby. In another case, the presence of the object can be deduced as soon as a changed, in particular the further, second and/or current, measurement signal additionally no longer corresponds to the dependent effect nor can be explained by it. For the corresponding further, second and/or current measurement signal, the dependent effect therefore does not apply since it has changed due to the presence of the object. It is conceivable to determine the dependent effect only in sections and optionally to complete it, in particular by interpolation.

The determination of the dependent effect can preferably take place in advance of an actual measurement for a plurality of articles, wherein for the plurality of the articles, for example, a reference table can be stored. The articles can be, for example, coverings, in particular coverings of different thickness and/or different materials, in particular wood, cardboard, plaster, render, cement and/or others. The object can be a beam and/or a support, in particular made of different materials and different thicknesses, in particular wood, metal, fibre composite materials and/or the like. Alternatively or additionally, it is conceivable that following putting a corresponding device into use, thus here at the start of the process, the determination of the effect dependent on the distance from the article takes place.

At the start of a measurement, advantageously, the sensors must first be brought so close to the article that both the article and the possibly hidden object lie within the measuring range. Advantageously, this process which must necessarily be carried out can be used initially to determine the effect that is dependent upon the distance of the sensor from the article. The method can be initialized in this way. Following this first approach, firstly the dependent effect can be stored in order, as soon as the hidden object enters into the measuring range of the sensor, to compare said effect with the then occurring change in the effect and therefrom to detect the hidden object or to indicate it as present. Alternatively or additionally, it is also conceivable to utilize slight distance changes that occur during a measurement in order to determine, validate and/or adapt the effect dependent on the distance of the sensor from the article. This preferably occurs in measurement periods in which the object is not situated behind the article.

A sensor can be understood as any desired electrical component to which an alternating voltage is applicable and which interacts with the article and/or the object, in particular a coil or an electrode. An adjacent arrangement of the sensors can be understood as meaning that they are arranged relative to one another spatially such that they can interact with one another. In particular, this can be understood to mean that they have and/or form a capacitance relative to one another. Preferably, the sensor can be arranged as electrodes in one plane, in particular arranged within one another, in particular arranged concentrically to one another lying in a common plane. With a concentric arrangement, advantageously a measurement can take place independently of a movement direction of the sensor relative to the article and/or the hidden object.

In one embodiment of the method, a generation of a measuring alternating voltage, a filtering of the measuring alternating voltage by means of a filter effecting a phase shift and thereby, a generation of the first alternating voltage is provided. Advantageously, the measuring alternating voltage can be generated by means of a common alternating voltage source, wherein this can be so modified and/or filtered by means of the filter that the first and the second alternating voltage are available. Advantageously, a phase shift between the first and second alternating voltage can be enabled thereby. It has been discovered that during a measurement, that is, while the article and/or the hidden object are in the measuring range, the article and/or the object, the first sensor and the second sensor enter into interaction such that the phase shift occurring between the sensors changes. Advantageously, this change of the phase shift can be used for the determination of the dependent effect and as a consequence thereof, the change of this dependent effect.

A further embodiment of the method is carried out with application of the measuring alternating voltage to a measuring voltage divider, tapping of the second alternating voltage at the measuring voltage divider for application of the second alternating voltage at the second sensor. Advantageously, by this means, a parallel connection arises between the measuring voltage divider and the second sensor, whereby advantageously during the detection of the hidden object, a change of an output voltage of the measuring voltage divider is thereby produced which can advantageously be further processed for measurement or detection of the hidden object.

In a further embodiment of the method, the filter has a low impedance as compared with the measuring voltage divider.

During a measurement, that is, during a detection of the hidden object, the sensors act more strongly on one another than in the presence of the object. Advantageously, due to the different impedance, it can be achieved that the voltage on the measuring voltage divider and/or, as a result, on the second sensor is affected by the influence of the first sensor, since the first sensor is supplied with voltage via the filter having the lower impedance. Advantageously, by this means, a more sensitive measurement can take place. Thus advantageously thereby, i.e. by means of the filter at the first sensor, a relatively low impedant electromagnetic field, which advantageously can be little influenced, can be generated, which field can be impressed by means of the interaction at the article and/or the object, on the second sensor and thus also on the downstream measuring voltage divider which has a relatively high impedance. Advantageously, by this means, a phase shift can also occur to a relatively large extent at the measuring voltage divider. At the second sensor, therefore, a relatively high impedant electromagnetic field arises which advantageously, in the event of the detection of the object, is relatively strongly influenceable.

A further embodiment of the method is carried out with the generation of a reference alternating voltage phase-shifted by 180° to the measuring alternating voltage and the application of the reference alternating voltage to a reference path connected in parallel with the sensors. Advantageously, by means of the reference path, an at least partial compensation of the sensors can take place and in particular a compensation can take place during an unloaded state, that is, provided the article and/or the object is not in the measuring range of the sensors.

In a further embodiment of the method, a measuring path having the sensors, the filter and the measuring voltage divider is connected in parallel with the reference path. Advantageously, the reference path can be compared with the measuring path. In particular, this can take place by means of an addition of the signals. Advantageously, the measuring alternating voltage and the reference alternating voltage are phase-shifted so that, in particular, an at least partial cancellation of the output signals of the reference path and the measuring path can take place. Advantageously therefore, in particular in the unloaded state, there results a signal compensated to zero. Advantageously, such a signal can be further processed with relatively high amplification levels. Advantageously thereby, a particularly accurate and/or sensitive detection of the object can take place.

In a further embodiment of the method, the reference path is constructed similarly to the measuring path. Similarly constructed can be understood to mean that they have an identical response and/or identical electrical circuit elements and/or electrical circuit elements with identical electrical characteristics. In particular, it is conceivable that the reference path reproduces electrical characteristics, in particular impedances and/or capacitances of the sensor. In particular, it is conceivable that herein the response of the reference path is set so that it corresponds to an unloaded state, that is, when the object and/or the article are not within the measuring range of the sensors. Alternatively, it is conceivable to configure the reference path so that its response corresponds to the response of the measuring path provided the article is within the measuring range. Advantageously, by this means, the previously described compensation to the zero signal can take place in the corresponding measuring state of the sensor. A zero signal can be understood as a signal which, apart from noise that is possibly present, contains no information. In particular, this can be understood to mean that in the case of alternating voltages, no phase and no amplitude occur. In particular, in this regard a d.c. voltage and/or a noise-laden d.c. voltage can be understood as the zero signal. As a special case, a signal having 0 V can be understood as a zero signal.

A further embodiment of the method is carried out with the addition of a reference output signal of the reference path with a primary measurement output signal of the measuring path to a secondary measurement output signal. Advantageously, the reference output signal and the primary measurement output signal cancel each other out, at least mostly, due to the phase shift dependent upon the measuring state, in the ideal case to the above described zero signal. Particularly advantageously, it can be provided that due to the measurement, any existing changes of the secondary measurement output signal are adjusted to the zero signal by means of a controller. Advantageously, by means of the inclusion of the reference path, a relatively larger regulating range is possible. Alternatively, however, it is also conceivable to dispense with the reference path and to undertake a corresponding compensation to the zero signal purely by means of the controller.

A further embodiment of the method is carried out with the setting of a target value for the secondary measurement output signal, influencing the secondary measurement output signal dependent upon the target value by means of a control signal of a controller, evaluation of the control signal for determination of the dependent effect and the change of the dependent effect. Advantageously, it is thereby possible, for detecting the object, to evaluate not the secondary measurement output signal itself, but merely the control signal.

The controller preferably acts on an output of the measuring path wherein the secondary measurement output signal of the measuring path can be regarded as a disturbance variable of a control circuit having the controller. The controller is therefore connected upstream and downstream of the reference path and the measuring path equally. The secondary measurement output signal serves as the controlled variable. It is in principle conceivable to control the secondary measurement output signal to any desired signal form. It has been found to be particularly favourable, however, to regulate the secondary measurement output signal to the previously described zero signal, wherein advantageously by means of the controller, the signal having only noise is generated. By means of a suitable control measuring path which serves as an input of the controller, it is advantageously possible particularly simply to ascertain a change in this noise and to compensate for it accordingly. Advantageously, the secondary measurement output signal can be relatively highly amplified thereby. Advantageously, a particularly sensitive detection of the object can take place thereby. A special feature is therefore the actual measuring path, in particular its output, to the control path, said output preferably being connected downstream of a further control measuring path which underlies the control. The controller therefore preferably does not act upon the measuring path as such, but sets the secondary measurement output signal of the measuring path by adding in the control signal.

A further embodiment of the method is carried out with the determination of a course of the control signal dependent upon the distance of the sensors from the article. Advantageously, initially the course dependent upon the distance is determined. Alternatively, this can be stored and/or buffered. Advantageously, this can take place in the form of an effect correlation and/or a function of the distance. Advantageously, therefore, by means of the control signal and the dependent course, it can be concluded whether a change in the control signal results from a possibly unintentional change of the distance of the sensor from the article or from the presence of the object.

A further embodiment of the method is carried out with the determination of the course in the form of a vector analysis in a phase space of the control signal. In the phase space, a non-time-dependent state of the control signal can be represented in a known manner. This can take place, in particular, in four quadrants of a coordinate system, wherein a point in the phase space corresponds in each case to a non-time-dependent possible state of the control signal. Advantageously, for the determination of the course, a plurality of such points can be determined which are then advantageously representable graphically in the phase space. The plurality of the points can advantageously represent, for one particular of the articles, a function of the control signal dependent upon the distance. Advantageously, therefore, at any desired time point, a momentary recording of the control signal can be compared with the course determined. This preferably takes place in a steady-state condition of the control circuit or the controller. Initially, therefore, a settling of the control circuit and/or the controller, or a setting of the target value takes place. Insofar as a match and/or an approximate match results, under the condition that only the article is present in the measuring range of the sensor, the distance can be deduced at least qualitatively. However, for the measurement, another interpretation is particularly advantageous, specifically that the control signal is evaluated such that an accordance of the control signal with any desired point of the course can be made equivalent thereto that the object is not in the measuring range of the sensor, or vice versa. Advantageously, this decision can be made independently of an actual distance of the sensor from the article. It is thus possible, in the knowledge of the determined course in the case also of unintentional changes of a distance of the sensor from the article, for example, caused by manual guidance and/or slight tilting, to conclude the absence of the object. Conversely, it is therefore also possible, as soon as the control signal changes such that it no longer matches the course and/or at least no longer approximately matches it, to conclude the presence of the object.

A further embodiment of the method is carried out with the determination of the course during an approach of the sensors to the article before a detection of the object. Determination can be understood to mean that the points of the control signal in the phase space are determined during the approach and stored. This can take place as soon as the article is detected, that is, a point in the phase space that deviates from an unloaded state occurs. This can take place multiple times so that a set of points which forms the course is determinable. Advantageously, the course can thus take place immediately before an actual measurement, that is, the detection. Alternatively, it is conceivable to determine the course not immediately before the detection of the object, but in preceding tests with a plurality of articles, wherein for each individual article, a corresponding course is storable in a corresponding table. Then, during the actual measurement, the determination of the course can be understood, not as a measurement thereof, but merely a selection from the previously stored table. In this way, the relevant course of the control signal in the phase space can also be determined for the currently present article.

A further embodiment of the method is carried out with the determination of an area in the phase space delimited by the course or a vector and determination of the change as a function of the area. It has been found that the dependent effect can be described as a vector representing the measurement signal in the phase space with an at least partially and/or approximately constant phase angle but with a magnitude dependent upon the distance. It can at least be assumed that an angle change caused by an unintentional distance change is small relative to such as is caused by the presence of the object. A change of the vector caused by the object thus brings about an angle change. Since the magnitude of the vector is also dependent at least mainly only upon the distance, even in the presence of the object, the presence of the object substantially causes only an angle change from which the object could be deduced. A magnitude change occurring during the measurement can therefore be ignored and traced back to a possible unintentional distance change. For evaluation, the angle change as such and/or an area spanned by the vector without an object and by a further vector with the object can be assessed. This is also possible with an area spanned by the course and by a further course resulting with the object. Thus an angle change, even if only small, originating from a change in the distance can advantageously also be left out of consideration during the evaluation or during the detection of the object.

A further embodiment of the method is carried out with the pre-setting of a threshold value for the course, comparison of the control signal with the threshold value and detection of the object as soon as the control signal deviates so far from the course that the threshold value is exceeded. A threshold value can be understood as a distance from a single point and/or from the course. In particular, a surrounding area around the course can be understood wherein the surrounding area can be represented in the phase space. An exceeding of the threshold value can be understood as leaving the surrounding area. Advantageously, therefore, by means of the threshold value, the change in the dependent effect can be determined. The dependent effect can be understood to be the course of the control signal. Advantageously, it has been recognized that the changing of the dependent effect is equivalent to leaving the surrounding area and/or exceeding the threshold value. Alternatively, the changing of the dependent effect can be understood in that for the control signal analysable in the phase space, a different functional relationship applies, if the object is situated together with the article in the detection range of the sensor. For the measurement, this change can advantageously be determined. Alternatively or additionally, it is conceivable to describe this as a further function of the control signal in the phase space wherein the function conceptually moves through the surrounding area of the course and then out therefrom. Fundamentally, however, it is necessary for the detection of the object only to determine the change as such and, based thereon, to indicate or detect the object. In particular, it is conceivable also for the article together with the object to determine a plurality of functional relationships and to provide them in a table, wherein the change of the effect can take place through allocation to a value in the table, whereby the object is thereby detectable.

With the measuring arrangement, a detection of the object can advantageously take place substantially independently of the distance of the article from the sensors. The measuring arrangement is configured, equipped, constructed and/or programmed, in particular, for carrying out the above described method. In this respect the above described advantages arise.

An exemplary embodiment of the measuring arrangement comprises a circuit arrangement comprising the sensors and a controller connected upstream of the analysis apparatus and downstream of the circuit arrangement on the input side and connected in parallel on the output side, wherein a regulating behaviour of the controller for determining the effect and/or the change of the effect is analysable by means of the analysis apparatus. Advantageously, dependent upon the regulating behaviour of the controller, the effect and/or the change of the effect can be determined. In particular, this can take place in a phase space. In particular, by means of an evaluation of a control signal wherein the regulating behaviour can be understood to be a signal course of the control signal.

Further advantages are disclosed in the subclaims and the following description of an exemplary embodiment.

BRIEF DESCRIPTION OF THE FIGURES

The invention will now be described in greater detail making reference to an exemplary embodiment illustrated in the accompanying figures. In the drawings:

FIG. 5 shows a sensor of the circuit arrangement illustrated in FIG. 4 during an approach to an article;

FIG. 6 shows the sensor shown in FIG. 5 during a movement along the article for detecting an object hidden behind the article.

DETAILED DESCRIPTION

The invention will now be described in greater detail making reference to the accompanying drawings. The exemplary embodiments merely represent examples which are not intended to restrict the inventive concept to a particular arrangement. Before the invention is described in detail, it should be noted that the invention is not restricted to the various components of the device and the various method steps, since said components and method can vary. The expressions used here are intended merely to describe particular embodiments and are not used restrictively. Furthermore, where the singular or the indefinite article is used in the description or the claims, this also relates to a plurality of these elements, provided the overall context does not unambiguously reveal otherwise.

Figure 2:
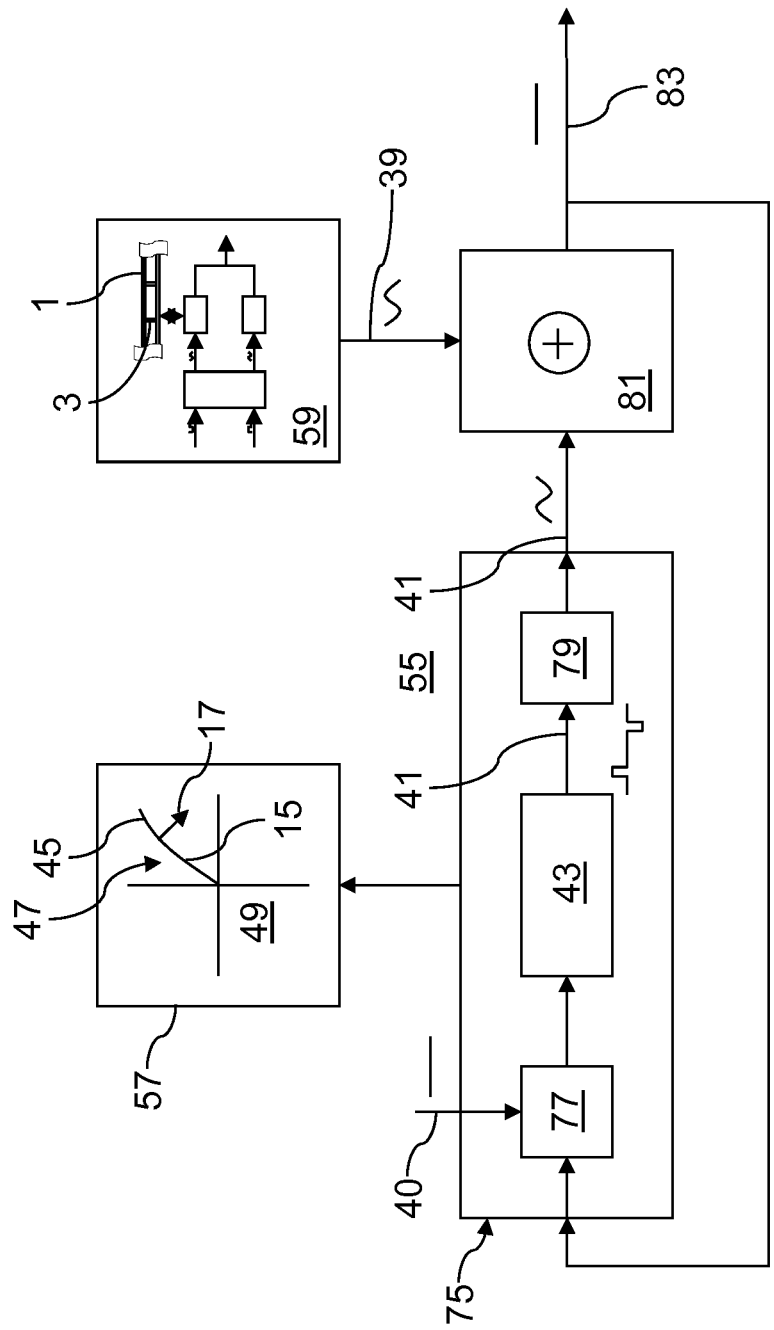
FIG. 2 shows a block circuit diagram of a measuring arrangement for carrying out the method illustrated in FIG. 1.

FIG. 2 shows a block circuit diagram of a measuring arrangement 55 for detecting an object hidden behind an article. The measuring arrangement 55 comprises an analysis apparatus 57. By means of the analysis apparatus 57, an analysis, in particular a vector analysis of signals generated by means of the measuring arrangement 55 for detecting the object 3 can take place. Furthermore, the measuring arrangement 55 comprises a circuit arrangement 59. The circuit arrangement 59 comprises, apart from electrical or electronic components, sensors which, to detect the object, can enter into an interaction therewith. The circuit arrangement 59 supplies a secondary measurement output signal 39. The secondary measurement output signal 39 can be present in the form of an alternating voltage. In an unloaded or compensated state, the secondary measurement output signal 39 can be present as a so-called zero signal which has, in particular, merely an information-free noise.

Furthermore, the measuring arrangement 55 comprises a control action chain 75. The control action chain 75 comprises a target value comparison 77 for comparing with a target value 40 for the secondary measurement output signal 39 and, connected downstream of the target value comparison 77, a controller 43. The controller 43 generates a control signal 41. The control signal 41 can be generated, in particular, as a square wave signal of a pulse width modulation. Optionally, a demodulator 79 is connected downstream of the controller 43. The demodulator 79 can have, for example, a smoothing filter. In particular, it is conceivable that the demodulator 79 reduces the control signal 41 to a fundamental wave. In particular, the control signal 41 is present as a three-level signal. Alternatively or additionally, however, it is also conceivable that the controller 43 has a plurality of pulse width modulators so that these can be added to the control signal 41 wherein, this signal can be present as a multi-point signal.

A summing point 81 is connected downstream of the control action chain 75. The summing point 81 can, in the simplest case, be an electrical contacting of the output of the control action chain 75 with an output of the circuit arrangement 59.

In a preferred exemplary embodiment, a target value 40 for the secondary measurement output signal 39, said value corresponding to a zero signal, is fed to the target value comparison 77. Accordingly, the controller 43 sets the control signal 41 such that it is antiphase to the secondary measurement output signal 39, so that following the summing point 81, both are added to the preferably zero signal. The control action chain 75 can have a control measuring path (not shown in greater detail) which is connected upstream of the target value comparison 77 for measuring the controlled variable 83 resulting as the output variable of the summing point 81. Advantageously, the controlled variable 83 can be set information-free in a stablised state, that is, possibly except for any noise present, having no signal component, provided the target value 40 specifies this. It is apparent in FIG. 2 that the circuit arrangement 59 provided for the actual detection of the object acts as a disturbance variable on the control action chain 75. For the detection of the object 3, the control signal 41 or a signal dependent on the control signal 41 can advantageously be passed on to the analysis apparatus 57. Advantageously, by means of the analysis apparatus 57, by means of an analysis or an evaluation of the control signal 41 or the signal dependent thereon, it can be determined whether the object is situated behind the article or not, i.e. in order to determine the dependent effect 15 and/or the change 17 in the dependent effect.

Figure 3:
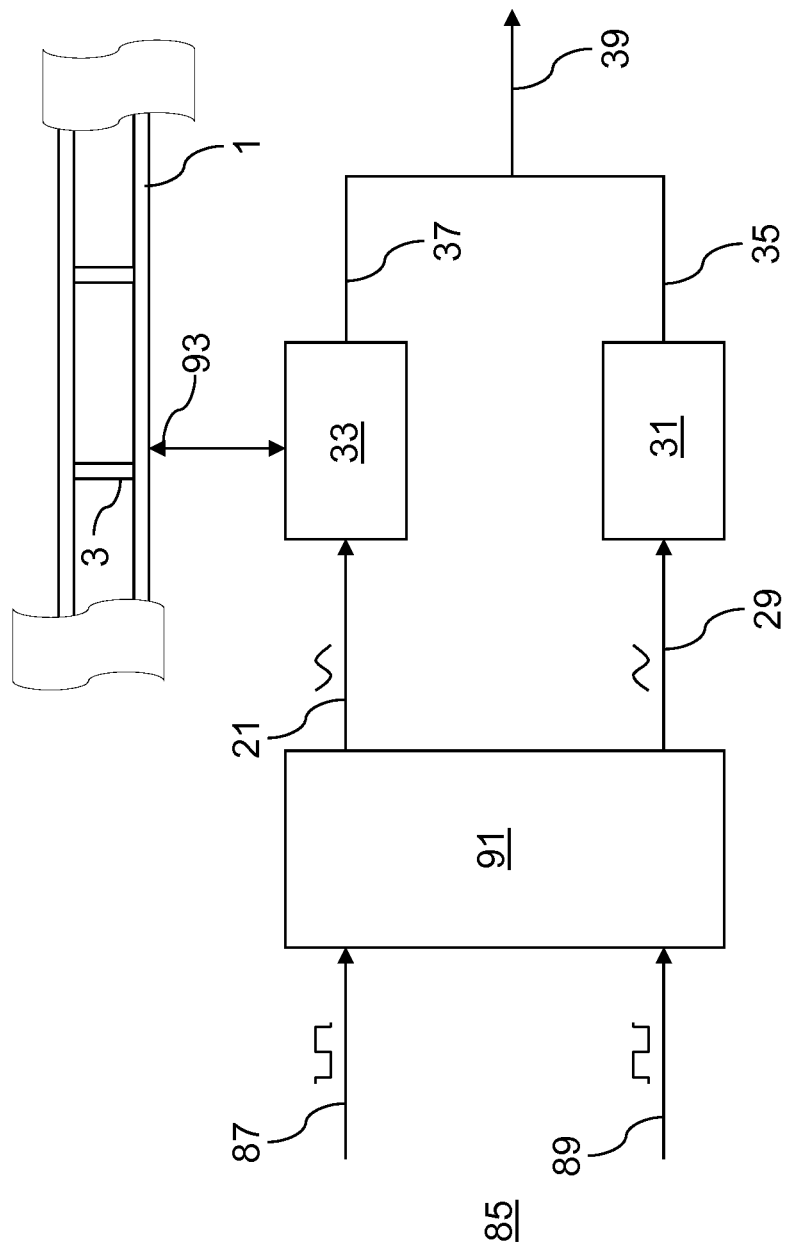
FIG. 3 shows a further block circuit diagram of a circuit arrangement of the measuring arrangement illustrated in FIG. 2.

FIG. 3 shows a more detailed block circuit arrangement of the circuit arrangement 59 illustrated in FIG. 2. A clock signal 87 generated by a clock generator symbolised merely by the reference sign 85 is fed to the circuit arrangement 59. The clock signal 87 can be, in particular, a square-wave signal. In addition, a further clock signal 89 is fed to the circuit arrangement 59. The further clock signal 89 is antiphase to the clock signal 87. In particular, the further clock signal 89 can be generated from the clock signal 87 by a suitable circuit. The clock signals 87 and 89 are fed to an optional series circuit 91. The optional series circuit 91 can be provided, in particular, to smooth the clock signals 87 and 89 and/or to amplify an amplitude thereof and/or to change a frequency thereof.

As output variables, the series circuit 91 has a measuring alternating voltage 21 which is present, in particular, in the form of the smoothed and/or amplified clock signal 87 and a reference alternating voltage 29 which, in particular, is present as a smoothed and/or amplified further clock signal 89. In particular, after the smoothing, the measuring alternating voltage 21 and the reference alternating voltage 29 have a sinusoidal, or at least as far as possible sinusoidal, shape.

The measuring alternating voltage 21 serves as an input variable of a measuring path 33. The reference alternating voltage 29 serves as an input variable of a reference path 31. The reference path 31 is connected in parallel with the measuring path 33 and in particular is electrically connected and/or constructed so that it corresponds to the measuring path 33 in a pre-determined and/or pre-determinable state. This state can be, in particular, an unloaded state of the measuring path 33, that is, when it detects neither an article 1 nor an object 3 hidden therebehind.

By means of a double arrow 93 in FIG. 3, it is symbolized that for the purpose of detecting the object 3, the measuring path 33 can enter into an interaction therewith and/or with the article 1 hiding the object. In FIG. 3, the article 1 and the object 3 are merely indicated in a sectional representation. The article 1 can be a wall and/or a covering of a wall built in a stud construction. The object 3 can be a corresponding stud of such a wall, in particular a wooden post and/or a metal post.

As the result of the interaction with the article 1 and/or the object 3, the measuring path 33 supplies a primary measurement output signal 37. The reference path 31 supplies a reference output signal 35 independent of the interaction symbolized by the double arrow 93. The reference output signal 35 and the primary measurement output signal 37 are summed to the secondary measurement output signal 39 described in relation to FIG. 2. The reference path 31 is not required, although it advantageously offers the possibility that the secondary measurement output signal 39 is generatable as described above as a zero signal in the pre-determined or pre-determinable state of the circuit arrangement 59, in particular without further control actions and/or influences.

Figure 4:
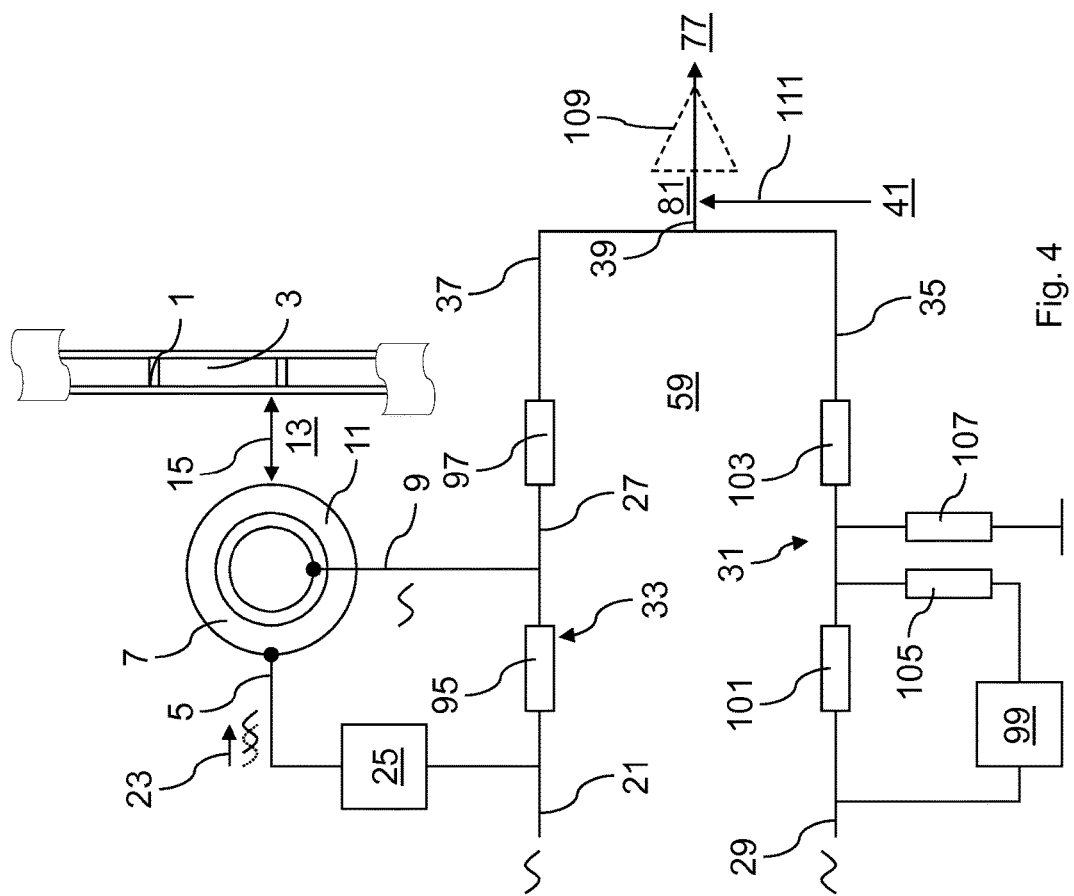
FIG. 4 shows a more detailed exemplary embodiment of the circuit arrangement illustrated in FIG. 3.

FIG. 4 shows a detailed view of the circuit arrangement 59 illustrated in FIG. 3, wherein the series circuit 91 is not shown. The measuring path 33 of the circuit arrangement 59 has a filter 25 to which the measuring alternating voltage 21 is applied. The filter 25 causes a phase shift 23 of the measuring alternating voltage 21 and supplies a first alternating voltage 5 as the output quantity. The first alternating voltage 5 is therefore phase-shifted against the measuring alternating voltage 21. The filter 25 can have any desired construction, in particular as a low-pass or a high-pass filter. The output of the filter 25 is connected to a first sensor 7 of the measuring path 33. The first alternating voltage 5 therefore exists on the first sensor 7. Preferably, the first sensor 7 is an electrode. Preferably, the electrode of the first sensor 7 has a ring-shaped design.

The first sensor 7 is arranged adjoining a second sensor 11. The second sensor 11 preferably has a disk-shaped design, the second sensor 11 preferably being arranged concentrically within the first sensor 7. The measuring path 33 of the circuit arrangement 59 has a measuring voltage divider 27 with a first impedance 95 and a second impedance 97. A second alternating voltage 9 can be tapped off between the impedances 95 and 97. The second alternating voltage 9 is applied to the second sensor 11, which is, in particular, an electrode. It is conceivable to swap the connections of the sensors 7 and 11. It is advantageous that the sensors are arranged adjoining one another, that is, can enter into interaction within one another electrically.

The reference path 31 is connected in parallel with the measuring path 33 and preferably has a construction similar to the measuring path 33. In detail, the reference path 31 has a reference filter 99, a third impedance 101, a fourth impedance 103, a fifth impedance 105 and a sixth impedance 107.

The impedances 95, 97 and 101 to 107 are preferably capacitors. The third impedance 101 preferably corresponds to the first impedance 95 of the measuring path 33. The fourth impedance 103 preferably corresponds to the second impedance 97. The fifth impedance 105 preferably compensates for a capacitance occurring between the sensors 7 and 11. The sixth impedance 107 preferably corresponds to a capacitance of the first sensor 7, in particular the capacitance of the first sensor 7 in interaction with the article 1 and/or the object 3. In addition, a response of the reference filter 99 preferably corresponds to the response of the filter 25 of the measuring path 33. It is apparent that, as a result, the primary measurement output signal 37 existing at the end of the measuring path 33 and the reference output signal 35 existing at the end of the reference path 31 can be added, due to the parallel connection and the phase opposition of the measuring alternating voltage 21 and the reference alternating voltage 29, to the secondary measurement output signal 39, possibly in the form of the previously described zero signal. The secondary measurement output signal 39 can optionally be amplified by means of an amplifier 109 represented merely dashed in FIG. 4 and fed to the measuring path (not shown in detail) and/or the target value comparison 77 connected downstream thereof. By means of an arrow 111, it is indicated in FIG. 4 at which point of the circuit arrangement 59 the control signal 41, possibly pre-processed by means of the demodulator 79, acts upon the secondary measurement output signal 39.

FIG. 5 shows a sectional view of the article 1 and the object 3 together with a schematic representation of the sensors 7 and 11. FIG. 6 shows the sectional view according to FIG. 5, wherein by contrast, the sensors 7 and 11 are juxtaposed with the article 1.

Making reference to FIGS. 5 and 6, the execution of a measuring procedure for detecting the object 3 behind the article 1 will now be described in greater detail. Firstly, an approach 51 of the sensors 7 and 11 to the article 1 takes place. By this means, the sensors 7 and 11 enter into an interaction with the article 1. Advantageously, during the approach 51, this effect is determined and possibly stored. Advantageously, this can take place dependent upon a distance 13 of the sensors 7, 11 from the article 1. Subsequently there follows, as shown in FIG. 6, a movement 19 wherein the sensors 7 and 11 are moved in the direction of the object 3 hidden behind the article 1. As soon as the object 3 is also within a detection range of the sensors 7, 11, a change in the effect takes place. Advantageously, dependent upon this change in the effect, the object 3 can be detected. Advantageously, a qualitative determination of the effect suffices. A quantitative output concerning a concrete actual distance of the sensors 7, 11 from the article 1 is advantageously not required.

Figure 1:
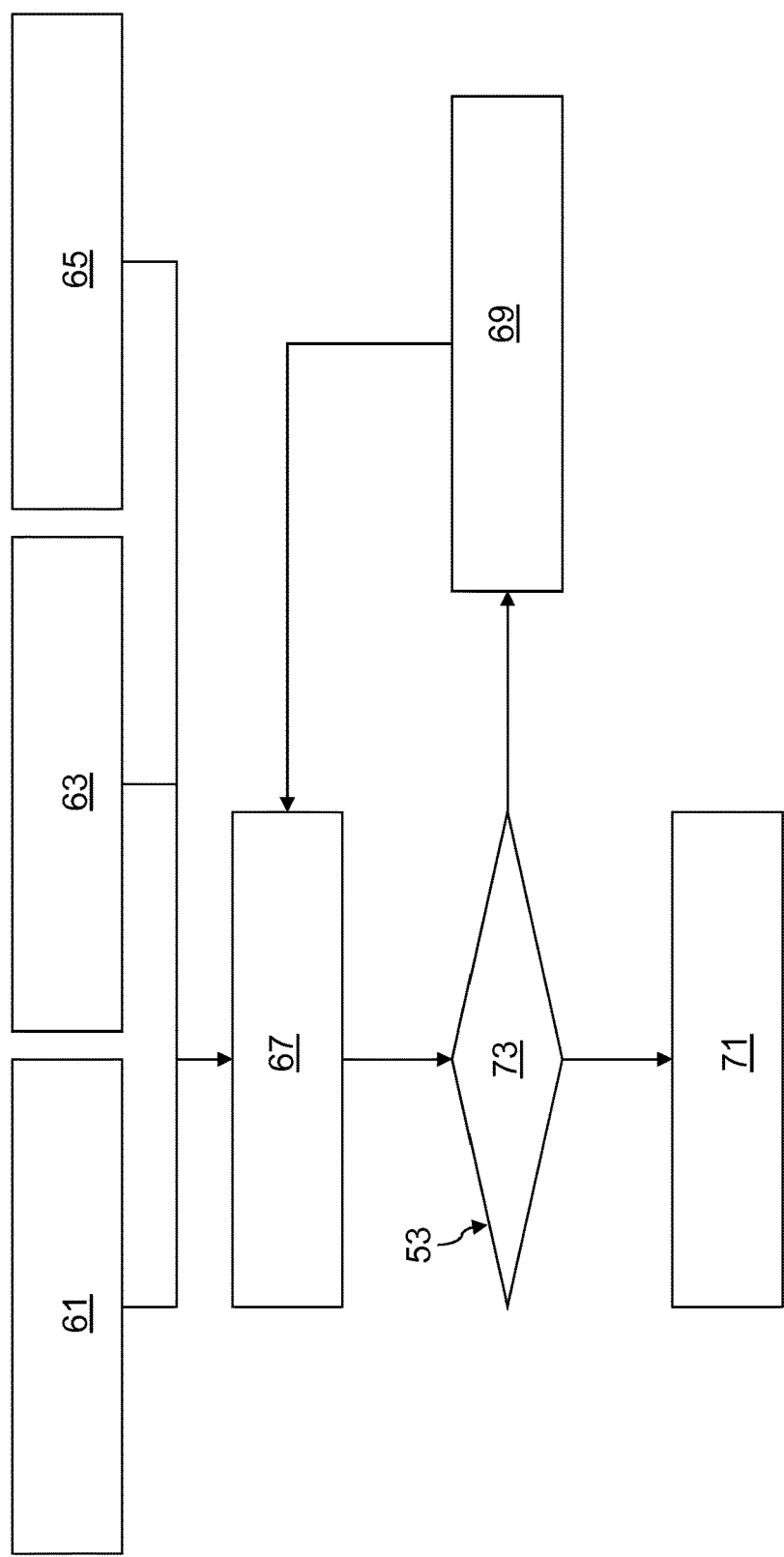
FIG. 1 shows a flow diagram of a method for detecting an object hidden behind an article.

A method for detecting the object 3 behind the article 1 will now be described in detail by reference to FIG. 1. In a first step 61, the first alternating voltage 5 is applied to the first sensor 7. In a second step 63, the second alternating voltage 9 is applied to the second sensor 11. In a third step 65, the effect of the article 1 dependent upon the distance 13 is determined. The effect is indicated in FIG. 4 by means of a double arrow and the reference sign 15. In order to determine the effect 15, the movement 19 of the sensors 7 and 11 relative to the article 1 and the object 3 takes place. Preferably, the sensors 7, 11 are moved toward the article 1 at the start of a measurement.

In a fourth step 67, a change 17 of the effect 15 dependent upon the distance 13 is determined. This preferably takes place during the movement 19 of the sensors 7, 11 along the article 1, in particular along a surface of the article 1, in particular, by means of a manual guiding along of the sensor 7, 11. The effect 15 is advantageously dependent upon the distance 13, and exists in particular as a function and/or an effect correlation. In a comparison 73, a comparison takes place of the, in particular previously determined and stored, dependent effect 15 with an actual effect occurring during the movement 19, or the change 17 (FIG. 2) of the dependent effect 15. In particular, underlying the comparison 73 is a threshold value 53 with which the change 17 can be compared with the dependent effect 15. In the event that the threshold value 53 is not exceeded, the method branches into a fifth step 69 which indicates that the object 3 is not situated in the detection range of the sensors 7 and 11. The fifth step 69 branches back to the fourth step 67. This takes place cyclically until the threshold value 53 of the comparison 73 is exceeded wherein thereby the method branches to a sixth step 71. The sixth step 71 indicates that the object 3 is in the detection range of the sensors 7 and 11 and thus is detected. In particular, it is conceivable to define a plurality of threshold values and to base the comparison 73 upon them wherein for the detection of the object 3, it can be indicated how many of the threshold values are exceeded. Thus, a position of the object 3 can be more precisely determined. It is conceivable firstly to determine the change 17 as such, for example, in the form of a measured value or a scalar and to feed this to the comparison 73. Alternatively, however, it is also conceivable to undertake the comparison 73 directly with the determined and stored dependent effect 15 in comparison with the actual effect occurring during the movement 19, so that by means of the comparison 73, the change 17 can be determined and thereby the presence of the object 3 can be deduced. In both cases, the detection of the object 3 takes place dependent upon the change 17 of the dependent effect 15, that is, the distance-dependent function and/or the effect correlation.

The method will now be described in greater detail making reference to the analysis apparatus 57 shown in FIG. 2. The control signal 41 or a signal dependent thereon can be evaluated in a phase space 49 by means of a vector analysis 47. As the result of the vector analysis 47, the dependent effect 15 can be represented as a course 45 in the phase space 49. The course 45 is, in particular, a plurality of time-independent states of the control signal 41 of the controller 43 which occur during the approach 51 of the sensors 7 and 11 in the direction of the article 1. The phase points of the course 45 therefore represent a, particularly qualitative, functional relationship of the interaction of the article 1 with the sensors 7, 11 dependent upon the distance 13. Advantageously, a slight tilting of the sensors 7 and 11 relative to the article 1 leads to a change in the control signal 41, but only to a change of the control signal 41 on the, or along the, course 45.

Advantageously, as soon as the object 3 is situated in the detection range of the sensors 7 and 11, the change 17 can be determined by means of the vector analysis 47 as a deviation of the state of the control signal 41 from the course 45. Advantageously, this change 17 can be determined independently of a magnitude of a vector in the phase space 49. Rather, advantageously merely an angle of the relevant vector of the control signal 41 in the phase space 49 is significant as a deviation from the course 45. In particular, as the threshold value 53, a specification for such an angle of the vector analysis can be used. Alternatively or additionally, it is also conceivable to understand the course 45 as a surrounding area wherein a phase point of the control signal 41 which is not situated in the surrounding area of the course 45, the change 17 of the dependent effect 15, indicates the change 17 of the dependent effect 15, that is, detects the object 3.

Figure 7:
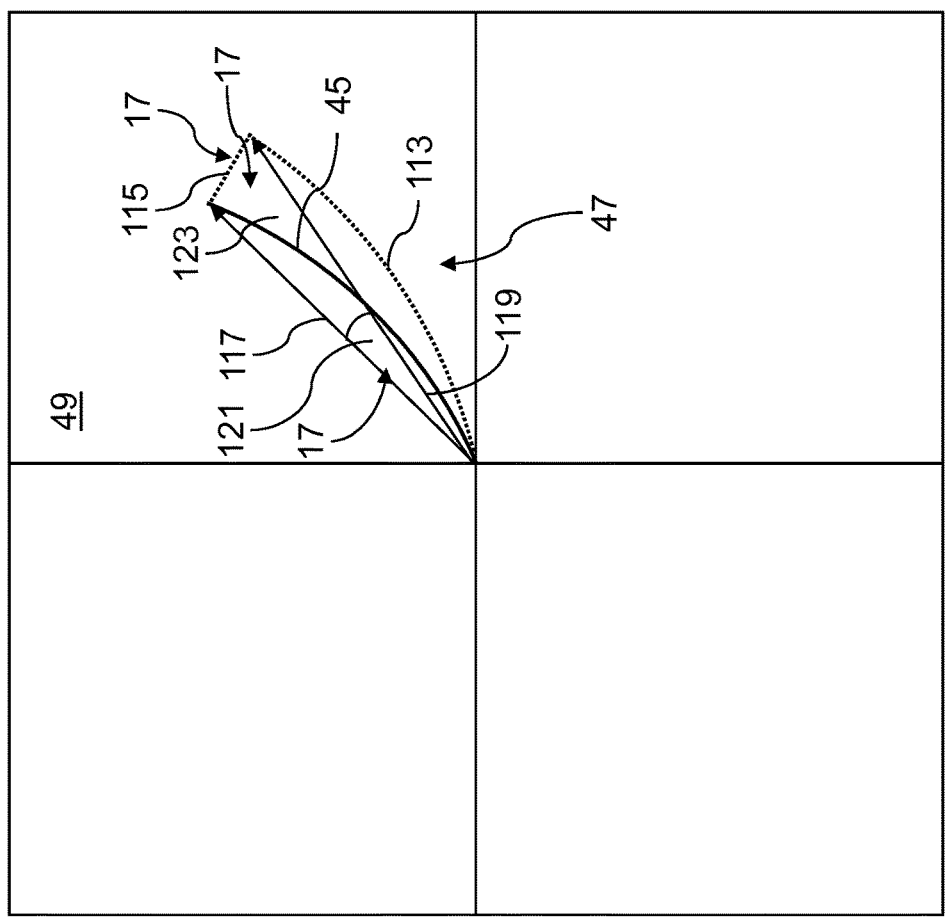
FIG. 7 shows a graphical representation of a dependent effect and a change of the dependent effect in a phase space.

FIG. 7 shows a detailed graphical representation of the phase space 49. The dependent effect 15 is represented by the course 45. Furthermore, shown dotted in FIG. 7 is a further course 113 which results after the change 17, that is if the article 1 and the object 3 therebehind are in a measuring range of the sensors 7, 11.

Particularly advantageously, it was recognized that the change 17 in the course 45 caused by the object 3 is associated with an angular change of the vector such that an area 123 between the course 45 of a change line 115 shown dotted and the newly occurring further course 113 is formed. This is advantageously also reliably possible with a possible change of the distance 13 between the sensors 7, 11 and the article 1 by tilting or lifting the sensors 7, 11. The further course 113 extends approximately or at least substantially parallel to the course 45 and/or has a similar curvature. The change line 115 can be interpreted as a further functional relationship or change function which occurs, in particular at a constant distance 13, if the sensors 7 and 11 are pushed toward and then over the object 3. Herein, the angle change of a vector describing the respective phase points lying on the change function which is recognized as advantageous also occurs. By way of example, in FIG. 7, a first vector 117, a second vector 119 and an angle 121 spanned by these are drawn in. The first vector 117 ends on the course 45, and thus represents a state in which only the article 1 lies in the measuring range of the sensors 7 and 11. The second vector 119 ends on the further course 113, and thus represents a state in which only the article 1 and the object 3 lie in the measuring range of the sensors 7 and 11. Thus, advantageously, different possibilities for recognizing the change 17 are conceivable.

As a first alternative, the change line 115 can be determined. Provided this is swept over by the vector, the change 17 can be deduced.

As a further alternative, the further course 113 can be determined. Provided this is determined and the second vector 119 of the current measurement signal points to this, the change 17 can be deduced.

As a further alternative, the angle 121 can be determined. In particular, if this exceeds a threshold value, the change 17 can be deduced. In addition, a measure of the angle can give information about a property of the object 3.

As a particularly advantageous alternative, initially the course 45, the change line 115 and the further course 113 can be determined. From these, the area 123 can then be determined. If the area 123 is determined or exceeds a particular measure, the change 17 can be deduced. Through the occurrence or determination of the area 123, the presence of the object 3 behind the article 1 can thus be established. It is conceivable, for the determination of the area 123, to determine the change line 115 and the further course 113 in just one step during the movement over the object 3, wherein a transition between the two can be flowing. What is important is only the occurrence or determination of the area 123 spanned by these and the course 45. It is apparent that unintentional changes of the distance 13 thereby occurring play no part since, independently thereof, the change of the area 123 occurs and for the actual establishment of the object 3, an absolute measure of the area 123 plays no part. Alternatively or additionally, the area 123 can also be determined as an area spanned by the vectors 117 and 119.

Summarizing, by means of the vector analysis 47, a system behaviour with regard to two parameters is investigated, specifically the position of the sensors 7, 11 relative to the article 1 and/or the object 3 as a first parameter and the presence of the object 3 as the second parameter. Advantageously, both parameters create a distinguishable system behaviour. Wherein, simplifying, the distance 13 can be regarded as a first parameter since, in particular, slight angular changes such as occur in practice act at least approximately like a distance change and/or bring it about. The dependent effect 15 is thus the effect which occurs when only the first parameter changes. This is advantageously shown in particular in the vector analysis 47 as the course 45. As soon as the second parameter also changes, that is, the object 3 enters into interaction with the sensors 7, 11, the change 17 can be determined by means of the vector analysis 47 and so the object 3 can be deduced.

In other words, this means that an object 3 is detected behind an article 1 if the object causes a change 17 relative to the previously recorded course 45. The deviation from the course 45 that is caused by an object 3 can indicate, in non-inventive devices such as are known, for example, from the prior art, that on detection of an object 3, simply just the course 45 has been continued from its end point onward. Furthermore, a possible change in the distance 13 of the sensor 7, 11 from the article 1 through tilting would then also result in a changed control signal 41 although the object 3 is still in the detection range of the sensors 7, 11, wherein however the control signal 41 would move along the course 45 back to the origin. This means that the control signal 41 would move from the point of a "maximum" adjusted control signal 41 with the same vector back again to the end point of the course 45. If the change of the distance 13 of the sensors 7, 11 from the article 1 further increases, the control signal 41 would continue its route further along the course 45 to the origin. It is apparent that such behaviour is not to be regarded as a change 17 of the dependent effect 15, since such devices can in principle detect only one parameter, in this case for example, the mass of articles/objects lying within the measuring range or the distance, since changes in the mass as well as the distance substantially provide an identical system response.

In comparison therewith, it is possible according to the invention to detect the change 17 of the dependent effect 15 caused by the object 3. A change 17 of the dependent effect 15 caused by an object 3 and thus a deviation from the course 45, that is, a change of the second parameter is advantageously normally associated with a change of the angle 121 between the first vector 117 and the second vector 119, so that on a change of the distance 13 between the sensors 7, 11 and the article 1 in the presence of the object 3 even due to tilting or lifting of the sensors 7, 11, an area 123 forms between the course 45, the change 17 and the new further course 113 now extending approximately parallel to the course 45. In practical use, this area 123 is then also the evidence for the presence of an object 3 behind an article 1. A change of only the first parameter, that is, the distance 13 is associated, by contrast, substantially with a quantity change of the first vector 117 or at least a merely comparatively small angular change, wherein the area 123 is also not formed. Advantageously, small changes of the distance 13 already occurring during a measuring procedure can be utilized for determining the area 123. If the sensors 7, 11 are placed on an object 3 at the start of a measurement, a direction of the angular change can additionally be determined, in particular, in order to calibrate the method accordingly and/or to output an error message, in particular, to prompt a user to place the sensors 7, 11 beside the object 3 again.

With regard to the advantageous vector analysis, reference is additionally made to the subsequently published applications from the same applicant with the application numbers DE 10 2013 226 887.4, DE 10 2014 010 671.3. These documents are expressly incorporated by reference into the subject matter of the present application and, in particular, reference is made to the drawings, the description of the drawings and the claims.

With the invention, a detection of an object 3 hidden behind an article 1 is so improved that the object 3 can be recognized as far as possible independently of a relative position of the device to the article 1, in particular an angular position, in particular also when the device for detecting the object 3 is moved manually over the article 1.

It is self-evident that this description can be subject to the widest variety of modifications, changes and adaptations, which belong within the scope of equivalents to the accompanying claims.

The invention claimed is:

1. A method for detecting an object hidden behind an article, comprising the steps
   applying a first alternating voltage to a first sensor,
   applying a second alternating voltage to a second sensor arranged adjacent to the first sensor,
   determining a distance-dependent function of an effect of the article on at least one of the alternating voltages,
   determining a change of a distance-dependency of the distance-dependent function on a movement of the first sensor and the second sensor along the article,
   detecting the object dependent upon the change of the distance-dependency of the distance-dependent function.

2. The method according to claim 1, comprising
   generating a measuring alternating voltage,
   filtering the measuring alternating voltage by means of a filter effecting a phase shift and thereby
   generating the first alternating voltage.

3. The method according to claim 2, comprising
   applying the measuring alternating voltage to a measuring voltage divider,
   tapping the second alternating voltage at the measuring voltage divider for applying the second alternating voltage to the second sensor.

4. The method according to claim 3, wherein the filter has a low or unequal impedance as compared with the measuring voltage divider.

5. The method according to claim 2, comprising
   generating a reference alternating voltage phase-shifted by 180° to the measuring alternating voltage,
   applying the reference alternating voltage to a reference path connected in parallel with the first and second sensors.

6. The method according to claim 5, wherein a measuring path comprising the first and second sensors, the filter and a measuring voltage divider is connected in parallel with the reference path, wherein the reference path is constructed analogously to the measuring path.

7. The method according to claim 6, comprising
adding a reference output signal of the reference path with a primary measurement output signal of the measuring path to a secondary measurement output signal.

8. The method according to claim 7, comprising
setting a target value for the secondary measurement output signal,
influencing the secondary measurement output signal dependent upon the target value by means of a control signal of a controller,
evaluating the control signal for determining the distance-dependent function and the change of the distance-dependent function.

9. The method according to claim 8, wherein it comprises at least one of the following steps
determining a course of the control signal dependent upon the distance of the first and second sensors from the article
determining the course in the form of a vector analysis in a phase space of the control signal
determining the course during an approach of the first and second sensors to the article before a detection of the object.

10. The method according to claim 9, comprising
determining an area in the phase space delimited by the course or a vector,
determining the change as a function of the area.

11. The method according to claim 9, comprising
pre-setting a threshold value for the course,
comparing the control signal with the threshold value,
detecting the object as soon as the control signal deviates so far from the course that the threshold value is exceeded.

12. The method according to one claim 1, comprising
determining a current distance-dependent function occurring during the movement of the first and second sensors along the article and a change of the current distance-dependent function as compared with the distance-dependent function,
detecting the object dependent upon the change of the current distance-dependent function as compared with the distance-dependent function.

13. The method according to claim 1, comprising
storing the distance-dependent function as determined,
comparing the stored distance-dependent function with a current effect occurring during the movement of the first and second sensors along the article to determine the change,
detecting the object dependent upon the comparing.

14. A measuring arrangement for detecting an object hidden behind an article, comprising:
a first sensor to which a first alternating voltage is appliable,
a second sensor arranged adjacent to the first sensor, to which a second alternating voltage is appliable, and
an analysis apparatus by configured to perform
determining a distance-dependent function of an effect of the article on at least one of the alternating voltages,
determining a change of a distance-dependency of the distance-dependent function on a movement of the first sensor and the second sensors along, and
detecting the object dependent upon the change of the distance-dependency of the distance-dependent function.

15. The measuring arrangement according to claim 14, comprising
a circuit arrangement comprising the first and second sensors, an input side and an output side,
a controller connected upstream of the analysis apparatus and downstream of the circuit arrangement on the input side and connected in parallel on the output side, wherein a regulating behaviour of the controller for determining at least one of the distance-dependent function or the change of the distance-dependent function is analysable by means of the analysis apparatus.

* * * * *